United States Patent [19]

Fracchia

[11] 4,368,070

[45] Jan. 11, 1983

[54] METHOD FOR SCRUBBING THE FLUES AND FOR RECOVERING THE SALTS IN A PROCESS FOR THE PRODUCTION OF SECONDARY ALUMINUM

[75] Inventor: Pierluigi Fracchia, Milan, Italy

[73] Assignee: A. Tonolli & C.S.p.A., Milan, Italy

[21] Appl. No.: 207,723

[22] Filed: Nov. 17, 1980

[30] Foreign Application Priority Data

Nov. 27, 1979 [IT] Italy .............................. 27605 A/79

[51] Int. Cl.$^3$ .......................................... C22B 21/00
[52] U.S. Cl. ...................................... 75/0.5 B; 75/24; 75/25; 75/68 R; 75/97 A; 266/147
[58] Field of Search ................ 75/68 R, 24, 25, 0.5 B, 75/97 A; 266/146, 147

[56] References Cited

U.S. PATENT DOCUMENTS 4,013,455 3/1977 Kleeberg et al. ................... 75/68 R
4,073,644 2/1978 Papafingos et al. .................... 75/24

Primary Examiner—M. J. Andrews
Attorney, Agent, or Firm—Charles A. Brown

[57] ABSTRACT

The invention relates to a process which makes possible the scrubbing of the flues and the recovery of the salts as contained in the oven slags for the remelting of aluminum scraps with a saline flux, by washing the slags with water and using the brine thus obtained for scrubbing the flues, until obtaining the saturation and the separation of the salt to be recycled as a flux.

3 Claims, 1 Drawing Figure

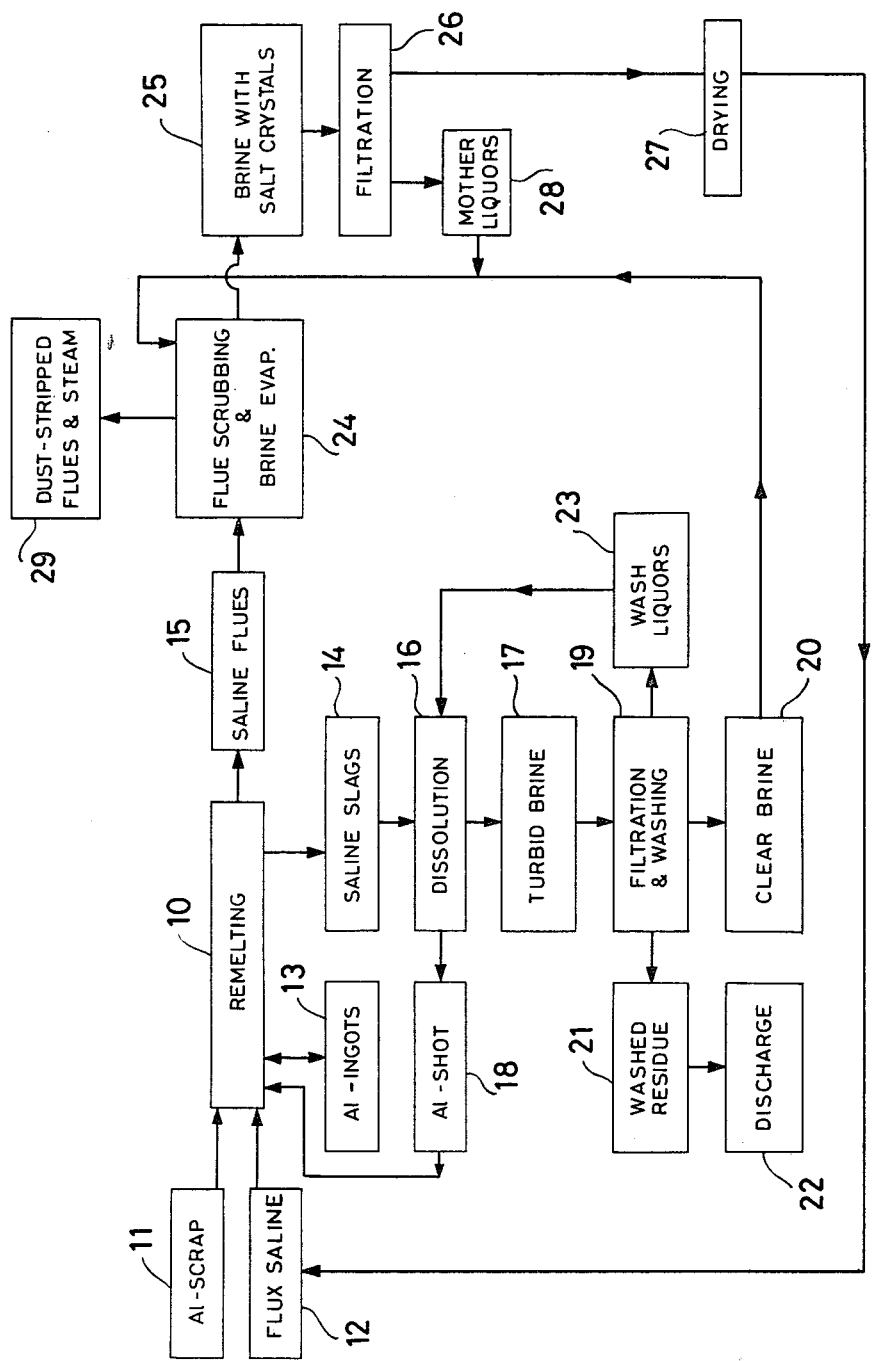

METHOD FOR SCRUBBING THE FLUES AND FOR RECOVERING THE SALTS IN A PROCESS FOR THE PRODUCTION OF SECONDARY ALUMINUM

The present invention relates to a process for recovering the salts used as a flux in the method of production of secondary aluminum, with a concurrent duct removal from the process flues. The invention also relates to an installation for carrying the process into practice.

The industry of secondary aluminum is subjected to considerable pressures from the local environment-protection authorities, both national and of the European Community, with a view of eliminating, or at least drastically reducing, the environmental pollution.

In practice, this industry is required to limit within very severely defined ranges:
1. the emission of solid particles into the atmosphere,
2. the saline content in the waste waters, and
3. the discharge of polluting solid residues.

On the other hand, the most efficient processes for recovering many aluminum scraps and clippings having an average or a low content of metal require the use of salt (sodium or potassium chloride or a mixture thereof) as a flux so that they give rise to:

Process flues the solid particle content of which is virtually pure salt,

End slags which are essentially composed by salt which, in the molten stage, exist in the processing cycle and removes from the metal bath the steriles (i.e. the nonmetallic parts) and foreign matter.

The conventional technique has suggested, obviously, the adoption of conventional methods such as the purification of the flues, for example by scrubbing.

It is quite true that atmospherical pollution can be offset by such an expedient, but the problem is still outstanding as to the discharge of the scrubbing waters which have a saline content that is an environment pollutant.

Also found a way of disposal of or a reusing process for the end slags which may prevent the environmental pollution at an acceptable cost.

As a matter of fact, the slags cannot be dumpled outdoors on account of the high solubility in water of their main component, i.e. salt.

In a few industrial areas of Northern Europe it is possible to dump the slags in abandoned mines of salt or potassic salts, but these approaches can be adopted only when local conditions so permit.

Methods have been suggested such as dissolution with recovery of the salt by concentration of the brines in multiple-effect evaporators but the considerable investment costs required for such apparatus and the rather high running costs ought not to be accepted as they are an undue economic burden.

The principal object of the present invention is to do away with the shortcomings of the conventional installations for the purification of the wastes in the secondary aluminum production plants, by concurrently reducing the wastes and the running costs.

Another object of the invention is to make possible the recovery of the salts from the slags and the flues of that particular type of installations, so that the salt may be reused in the scrap remelting stage with economical advantage.

Further objects and advantages of the invention will clearly appear from the description given hereinafter.

According to the invention, a process is provided for scrubbing the flues and recovering the flux salts from the slags withdrawn from a furnace in which the aluminum scrap is remelted with saline flux to produce secondary aluminum, the process being characterized in that the saline slags withdrawn from the furnace are treated with water in order to obtain a virtually insoluble residue and a brine, the latter being exploited as a scrubbing liquor in a scrubbing column for the furnace flues, the brine being concentrated in the scrubbing column by dissolving the salt entrained by the flues and by concurrent evaporation of the water phase until the solution becomes saturated and the salt precipitated, the salt crystallized in the brine being separated and fed back to the remelting furnace to be reused as the saline flux.

Still according to the invention, a system is provided for carrying the process outlined above into practice, the system being comprised of means for washing with water the slags removed from the furnace in order that a brine be produced, a scrubbing column for washing the flues to be fed by a scrubbing liquor which is solely the brine, a filter for the brine discharged from the scrubbing column for separating the solid crystallized phase, and means for recycling the filtered brine to the scrubbing column.

In order that the objects and the advantages of the invention may better be understood, a practical exemplary embodiment thereof will be described hereinafter, reference being had to the accompanying drawings which is a block diagram of the process according to this invention.

With reference to the diagram, a remelting furnace 10 receives aluminum scraps from storage 11 and saline flux from storage 12. In general, the saline flux is sodium or potassium chloride, or a mixture thereof.

From the remelting furnace 10 there are discharged solid aluminum in bars 13, saline slags 14 and saline flues 15. Both the slags and the flues, as is obvious, have a high saline content.

The slags are washed at 16 thus obtaining a turbid brine 17, and a granular solid phase 18 having an appreciable content of aluminum (Al-shots), to be recycled to the remelting furnace 10.

The turbid brine 17 to filtration and washing means 19, wherefrom there are discharged clear brine 20 and a solid nonmetallic phase 21, the latter being dumped at 22. The washing liquors are collected at 23 and recycled to the dissolution stage 14.

According to the invention, the clear brine 20 is sent to a flue-scrubbing appliance 24, the brine 20 being sprayed into the flues 15 in tiny drops. By so doing, the dust entrained by the flues 15 is abated and the saline phase is concurrently dissolved. In addition, heat is transferred by the flues to the brine 20 so that the brine is evaporated and thus further concentrated.

At the foot of the appliance 24 there is collected brine at 25, this brine containing salt crystals which are collected on a filter at 26, dried at 27 and recycled to storage 12 to be fed back to the remelting furnace 10.

The mother liquors from the filtration stage are sent to 28 and recycled to the appliance 24 with the brine 20.

The dust-stripped flues and the steam produced by the evaporation of the brine 20 in the appliance 24 are discharged through a smokestack 29.

It is apparent from the diagram as described above that an advantage of the process according to the invention is that the saline slags are disposed of by firstly dissolving them and subsequently recrystallizing the salts at the expense of the sensible heat, thus without power expenditure, while concurrently providing for the scrubbing of the flues themselves.

Thus, the problem of the disposal of the solid residues, and of the recycling of their saline content is solved with an economical advantage, concurrently with the problem of an efficient purification of the flues, so that the flues can be freely discharged into the atmosphere.

The materials to be dumped are essentially comprised of the washed nonmetallic residue 21 discharged at 22. The material 21, stripped of its saline content at 19, has a reduced volume and results in very little polluting for the environment so that its discharge does not require any special care.

None of the apparatus used for carrying the process outlined above into practice has a critical or particular configuration and thus is not a negligible advantage of this invention.

More particularly, the appliance 24 is, most appropriately, a scrubbing column of the Venturi type, known as a Venturi scrubber, which has the flues 15 flowing therethrough and these acquire a high velocity in the restricted portion of the Venturi into which the finely atomized brine 20 is sprayed.

The liquid-gas contact so obtained is fully satisfactory to the ends of the invention and makes possible a fair dissolution of the pollutants and an efficient heat exchange with evaporation and concentration of the washing brine.

In the actual practice of the process there is obtained a clear brine 20 which may contain approximately 300 g/l of sodium or potassium chloride and such brine is used for treating flues at a temperature which is widely variable (for example from 70° C. to 600° C.) and the flues may contain up to 15 g/m$^3$ of salts in solid submicroscopic particles.

Upon washing in the Venturi scrubber 24, to which, as usual, a cyclone separator is associated for separating the droplets of the scrubbing brine, the contents of solid matter in the flues never exceeds 50 mg/m$^3$ and the scrubbing brine is rapidly concentrated to saturation with a separation of the salts in minute crystals.

For example, there have been obtained, from the treatment of saline slags which exit the remelting furnace when exhausted, 5,600 liters of brine in a concentration of 305 g/l of NaCl.

This solution has been sent to a Venturi scrubber in which furnace flues were caused to flow, which contained, as an average, 5 g/m$^3$ of solid matters (94% NaCl, 2% Al$_2$O$_3$, 4% carbon residues, on a weight basis) with an average temperature of 250° C. and a rate of flow of 2,000 m$^3$ an hour.

Scrubbing is carried out by feeding the Venturi scrubber 24 with a pump at a rate of flow of 1,200 liters an hour.

After eight hours of operation of the system, during which the flues exit the scrubber at an average temperature of 68° C. with an average content of solid matter of 32 mg/m$^3$, the solution volume has been reduced to 3,600 liters (containing 315 g/l of NaCl) and there have been obtained, by subsequent filtration and drying of the filter cake, 650 kg of a salt which has such a quality and properties as to be reusable in the remelting furnace as a flux.

It is apparent that the mode of practical performance of the invention as described hereinabove, as well as the quantitative data supplied are more exemplary indication which have been given to make conspicuous the advantages and the objects of the invention. Within the scope thereof, a number of modifications and changes can be adopted by anyone skilled in the art without departing from the scope of the invention.

I claim:

1. A process for scrubbing flue gases and recovering salts from saline slags removed from an aluminum scrap smelting furnace using a salt flux for the production of secondary aluminum wherein the saline slags withdrawn from the furnace are treated with water to obtain a virtually insoluble residue and a clear brine, said process being characterized in that it comprises the step of feeding said brine as scrubbing liquor into a Venturi scrubber into which the said flue gases are sent separately, said brine being concentrated in the Venturi scrubber by dissolving the salts entrained by said flue gases and by evaporation of the water phase until there is saturation of said brine and precipitation of salt, said salt crystallized from said brine being separated from said brine and fed back to the smelting furnace as a new source of saline flux.

2. A process according to claim 1, characterized in that the saline slags withdrawn from the furnace when treated with water for dissolution of their saline content produce a substantially metallic fraction (Al shots) which is recycled to the smelting furnace and also a turbid brine which is filtered to separate a second solid fraction which is dumped and said clear brine.

3. A process according to claim 1, characterized in that said brine used as scrubbing liquor for said flue gases is sent to said Venturi scrubber, is recovered after nebulization into the stream of flue gases, filtered to separate therefrom a solid phase which consists chiefly of said crystallized salt and a liquid fraction which is recycled to the Venturi scrubber with said clear brine as scrubbing liquor.

* * * * *

UNITED STATES PATENT AND TRADEMARK OFFICE
CERTIFICATE OF CORRECTION

PATENT NO. : 4,368,070
DATED : January 11, 1983
INVENTOR(S) : Pierluigi Fracchia It is certified that error appears in the above–identified patent and that said Letters Patent are hereby corrected as shown below:

Column 1, line 9, change "duct" to read -- dust --.

Column 1, line 41, after "Also" insert -- there has not yet been --.

Signed and Sealed this

Twenty-fourth Day of January 1984

[SEAL]

Attest:

GERALD J. MOSSINGHOFF

Attesting Officer

Commissioner of Patents and Trademarks